United States Patent Office 3,093,652
Patented June 11, 1963

3,093,652
ALKYL 1-(2-ARYL-2-OXOALKYL)-4-PHENYLPIPERIDINE-4-CARBOXYLATES AND THEIR PREPARATION
Bill Elpern, Walnut Creek, Calif., assignor to Sterling Drug Inc., New York, N.Y., a corporation of Delaware
No Drawing. Filed Oct. 23, 1958, Ser. No. 769,059
6 Claims. (Cl. 260—293.2)

This invention relates to compositions of matter of the class of substituted piperidines and to their preparation.

The invention here resides in the concept of a composition having a molecular structure in which a 2-(monocarbocyclic-aryl)-2-oxo-(lower-alkyl) radical is attached to the nitrogen atom of the piperidine ring of lower-alkyl 4-phenylpiperidine-4-carboxylates and in a process for physically embodying such concept.

The physical embodiments of the concept are useful as intermediates in the preparation of compounds having pharmacological activity, in particular, analgesic activity. Specifically, they are useful in the preparation of the corresponding lower-alkyl 1-[2-(monocarbocyclic-aryl)-2-hydroxy-(lower-alkyl)]-4-phenylpiperidine-4-carboxylates which have been tested by standard pharmacological evaluation procedures in animals and found to possess analgesic activity.

Among the compounds of my invention are those which in free base form have the structural Formula I

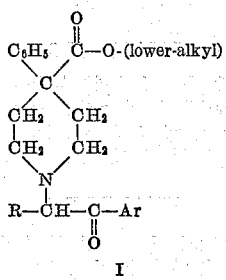

where R represents hydrogen, methyl or ethyl and Ar is a monocarbocyclic-aryl radical having six ring-carbon atoms.

The term "lower-alkyl," as used herein, means alkyl radicals having from one to six carbon atoms, inclusive, and is illustrated by methyl, ethyl, n-propyl, isopropyl, n-butyl, isobutyl, 2-butyl, n-amyl, n-hexyl, and the like.

The term "monocarbocyclic-aryl," as used herein, means aryl radicals having six ring-carbon atoms or, in other words, aryl radicals of the benzene series, and is illustrated by the unsubstituted phenyl radical and phenyl radicals bearing low-molecular weight substituents, preferably one to three, illustrated by nitro, amino, (lower-alkyl)amino, (lower-alkanoyl)amino, lower-alkyl, lower-alkoxy, benzyloxy, lower-alkylmercapto, lower-alkylsulfonyl, halo, and the like. Furthermore, these substituents can be in any of the available positions of the phenyl nucleus, and where more than one substituent, they can be the same or different and they can be in any of the various position combinations relative to each other. The (lower-alkyl)amino, (lower-alkanoyl)amino, lower-alkyl, lower-alkoxy, lower-alkylmercapto and lower-alkylsulfonyl substituents each has preferably from one to six carbon atoms which can be arranged as straight or branched chains.

The lower-alkyl 1-[(monocarbocyclic-aryl)-2-oxo-(lower-alkyl)]-4-phenylpiperidine-4-carboxylates are prepared by reacting a lower-alkyl 4-phenylpiperidine-4-carboxylate with a 2-(monocarbocyclic-aryl)-2-oxo-(lower-alkyl) ester of a strong inorganic or an organic sulfonic acid. Suitable esters are illustrated by 2-oxo-2-phenylethyl bromide, 2-oxo-2-phenylethyl chloride, 1-oxo-1-phenyl-2-propyl iodide (same as 1-methyl-2-oxo-2-phenylethyl iodide or alpha-iodopropiophenone), 1-oxo-1-phenyl-2-butyl sulfate (same as 1-ethyl-2-oxo-2-phenylethyl sulfate), 2-oxo-2-phenylethyl methanesulfonate, 1-oxo-1-phenyl-2-propyl benzenesulfonate, 2-oxo-2-phenylethyl para-toluenesulfonate, or the like, with the bromides being preferred. The reaction is carried out generally by heating, at a temperature between about 50° C. and 150° C., the lower-alkyl 4-phenylpiperidine-4-carboxylate with the 2-(monocarbocyclic-aryl)-2-oxo-(lower-alkyl) halide, preferably the bromide, in the presence or absence of a suitable solvent, but preferably in the presence of a solvent such as a lower-alkanol. Illustrative of the reaction is the preparation of ethyl 1-(2-oxo-2-phenylethyl)-4-phenylpiperidine-4-carboxylate by heating ethyl 4-phenylpiperidine-4-carboxylate with 2-oxo-2-phenylethyl bromide. This reaction is carried out preferably in refluxing n-butanol with stirring in the presence of an alkaline agent such as sodium carbonate to neutralize the hydrogen bromide formed by the reaction. The products are isolated in free base form or in the form of their acid-addition salts.

My lower-alkyl 1-[2-(monocarbocyclic-aryl)-2-oxo-(lower-alkyl)]-4-phenylpiperidine-4-carboxylates are useful in the free base form or in the form of acid-addition salts, and both forms are within the purview of the invention, and in fact, are considered to be one and the same invention. Since my compounds are useful as intermediates in the preparation of pharmacologically-active compounds, the acids which can be used to prepare the acid-addition salts are preferably those which produce, when combined with the freebase of the corresponding 1-[2-(monocarbocyclic-aryl)-2-hydroxy-(lower - alkyl)]-compounds, pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing my invention, I found it convenient to employ the hydrochloride salts. However, other appropriate pharmacologically acceptable salts within the scope of the invention are those derived from mineral acids such as hydrobromic acid, hydriodic acid, nitric acid, phosphoric acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfate, acetate, citrate, tartrate, lactate, methanesulfonate, ethanesulfonate and quinate, respectively.

The acid-addition salts are prepared either by dissolving the free base in aqueous solution containing the appropriate acid and isolating the salt by evaporating the solution, or by reacting the free base and acid in an organic solvent, in which case the salt separates directly or can be obtained by concentration of the solution.

Although pharmacologically acceptable salts are preferred, all acid-addition salts are within the scope of my invention. All acid-addition salts are useful as sources of the free base form even if the particular salt per se is not desired as the final product, as for example when the salt is formed only for purposes of purification or identification.

The compounds of my invention are used either in free base form or in the form of their acid-addition salts, preferably the former, when converted into the corresponding lower-alkyl 1-[2-(monocarbocyclic-aryl)-2-hydroxy-(lower-alkyl)] - 4-phenylpiperidine-4-carboxylates. The conversion is carried out by reacting my compounds with a reducing agent effective to reduce keto groups to hydroxy groups. The reduction can be carried out both by chemical methods and by catalytic hydrogenation.

Suitable chemical reducing agents include lithium aluminum hydride, lithium borohydride, sodium and ethanol, aluminum isopropoxide, etc. Catalysts suitable when catalytic hydrogenation is employed include Raney nickel, platinum oxide, copper-chromium oxide, and other catalysts generally effective to catalyze hydrogenation of keto groups to hydroxy groups. The preferred reductive procedure in practicing my invention comprised the catalytic hydrogenation of my intermediate keto compounds in lower-alkanol, e.g., n-butanol, solution using Raney nickel as the catalyst. Illustrative of this procedure is the reaction of ethyl 1-[1-(3,4-dibenzyloxyphenyl)-1-oxo-2-butyl]-4-phenylpiperidine-4-carboxylate with hydrogen under pressure at a temperature about 50 to 100° C. in the presence of Raney nickel to produce ethyl 1-[1-(3,4-dihydroxyphenyl) - 1 - hydroxy-2-butyl]-4-phenylpiperidine-4-carboxylate, which can be isolated in free base form or in the form of its acid-addition salt.

The lower-alkyl 1 - [2-(monocarbocyclic-aryl)-2-hydroxy - (lower-alkyl)]-4-phenylpiperidine-4-carboxylates are useful in the free base form or in the form of acid-addition salts, as discussed hereinabove for the corresponding intermediate lower-alkyl 1-[2-(monocarbocyclic-aryl)-2-oxo-(lower-alkyl)]-4-phenylpiperidine-4-carboxylates.

Another aspect of my invention resides in ethyl 1-[1-(3,4 - dihydroxyphenyl) - 1-hydroxy-2-butyl]-4-phenylpiperidine-4-carboxylate and its acid-addition salts, said salts embracing those disclosed hereinabove for my intermediate lower-alkyl 1-[2-(monocarbocyclic-aryl)-2-oxo-(lower-alkyl)]-4-phenylpiperidine-4-carboxylates.

The molecular structures of the compounds of my invention are established by their mode of synthesis and corroborated by the correspondence of calculated and found values for the elementary analyses for representative examples.

The following examples will further illustrate the invention without, however, limiting it thereto.

EXAMPLE 1

*Lower-Alkyl 1-[2-(Monocarbocyclic-Aryl)-2-Oxo-(Lower-Alkyl)]-4-Phenylpiperidine-4-Carboxylates*

The preparation of these compounds is illustrated by the following preparation of ethyl 1-[1-(3,4-dibenzyloxyphenyl)-1-oxo-2-butyl]-4-phenylpiperidine-4-carboxylate.

A mixture containing 11.6 g. of ethyl 4-phenylpiperidine-4-carboxylate, 22 g. of 1-(3,4-dibenzyloxyphenyl)-1-oxo-2-butyl bromide (alpha-bromo-3,4-dibenzyloxybutyrophenone), 100 cc. of dry n-butanol and 10 g. of anhydrous sodium carbonate was refluxed with stirring for about twenty-four hours. The reaction mixture was allowed to cool to room temperature and the precipitated sodium bromide was filtered off. The filtrate was distilled in vacuo to remove the solvent, thereby leaving a solid material which was crystallized from acetone-absolute ethanol to yield 24.3 g. of the product, ethyl 1-[1-(3,4-dibenzyloxyphenyl) - 1-oxo-2-butyl]-4-phenylpiperidine-4-carboxylate, M.P. 118.1–120.1° C. (corr.).

*Analysis.*—Calcd. for $C_{38}H_{41}NO_5$: C, 77.12; H, 6.99; O, 13.52. Found: C, 76.82; H, 6.77; O, 13.68.

Ethyl 1 - [1-(3,4-dibenzyloxyphenyl)-1-oxo-2-butyl]-4-phenylpiperidine-4-carboxylate is obtained as its hydrochloric acid-addition salt by treating its solution in ether with gaseous hydrogen chloride and collecting the precipitated salt. Similarly, use of hydrobromic acid, sulfamic acid or ethanesulfonic acid in place of hydrochloric acid results in the formation of the corresponding hydrobromide, sulfamate or ethanesulfonate salt, respectively. Any other acid-addition salt can be prepared in a similar manner using the desired acid.

The above-described preparation of ethyl 1-[1-(3,4-dibenzyloxyphenyl) - 1 - oxo-2-butyl]-4-phenylpiperidine-4-carboxylate also can be carried out by using in place of 1-(3,4-dibenzyloxyphenyl)-1-oxo-2-butyl bromide other esters such as 1-(3,4-dibenzyloxyphenyl)-1-oxo-2-butyl chloride or 1-(3,4-dibenzyloxyphenyl)-1-oxo-2-butyl paratoluenesulfonate.

EXAMPLE 2

*Ethyl 1 - (1-Oxo-1-Phenyl-2-Propyl)-4-Phenylpiperidine-4-Carboxylate*

A mixture containing 27.0 g. of ethyl 4-phenylpiperidine-4-carboxylate hydrochloride, 21.3 g. of 1-oxo-1-phenyl-2-propyl bromide (alpha-bromopropiophenone), 150 cc. of dry n-butanol and 20 g. of anhydrous sodium carbonate was refluxed with stirring for about twenty-three hours. To the hot reaction mixture was added about 100 cc. of methanol and the mixture was filtered while hot to remove the sodium bromide formed by the reaction. The filtrate was allowed to cool and the crystalline product that separated was collected and recrystallized several times from absolute ethanol, several times from n-butanol and once from 2-propanol. There was thus obtained about 5 g. of ethyl 1-(1-oxo-1-phenyl-2-propyl)-4-phenylpiperidine-4- carboxylate, M. P. 123.3–125.1° C. (corr.).

*Analysis.*—Calcd. for $C_{23}H_{27}NO_3$: C, 75.59; H, 7.45; O, 13.13. Found: C, 75.76; H, 7.17; O, 12.95.

Ethyl 1-(1-oxo-1-phenyl-2-propyl)-4-phenylpiperidine-4-carboxylate is obtained as its hydrochloric acid-addition salt by treating its solution in ether with gaseous hydrogen chloride and collecting the precipitated hydrochloride.

Other representative lower-alkyl 1-[2-(monocarbocyclic-aryl) - 2-oxo-(lower-alkyl)]-4-phenylpiperidine-4-carboxylates that can be prepared according to the procedure described in Example 1 using the corresponding lower-alkyl 4-phenylpiperidine-4-carboxylate and appropriate 1-[2-(monocarbocyclic-aryl)-2-oxo-(lower-alkyl)] ester of a strong inorganic acid or an organic sulfonic acid are the following compounds of Examples 3–15. These compounds can be isolated in their free base form or in the form of their acid-addition salts, preferably their hydrochlorides.

EXAMPLE 3

Ethyl 1-(2-oxo-2-phenylethyl)-4-phenylpiperidine-4-carboxylate is obtained following the procedure described in Example 1 using ethyl 4-phenylpiperidine-4-carboxylate and 2-oxo-2-phenylethyl bromide (alpha-bromoacetophenone).

EXAMPLE 4

Methyl 1 - (2-oxo-2-phenylethyl)-4-phenylpiperidine-4-carboxylate is obtained following the procedure described in Example 1 using methyl 4-phenylpiperidine-4-carboxylate and 2-oxo-2-phenylethyl chloride (alpha-chloroacetophenone).

EXAMPLE 5 n-Propyl 1 - [1 - (4-ethoxyphenyl)-1-oxo-2-propyl]-4-phenylpiperidine-4-carboxylate is obtained following the procedure described in Example 1 using n-propyl 4-phenylpiperidine-4-carboxylate and 1-(4-ethoxyphenyl)-1-oxo-2-propyl bromide (alpha-bromo-4-ethoxypropiophenone).

EXAMPLE 6 n-Butyl 1-[1-(3,4-dimethoxyphenyl)-1-oxo-2-butyl]-4-phenylpiperidine-4-carboxylate is obtained following the procedure described in Example 1 using n-butyl 4-phenylpiperidine-4-carboxylate and 1-(3,4-dimethoxyphenyl)-1-oxo-2-butyl bromide (alpha-bromo-3,4-dimethoxybutyrophenone).

EXAMPLE 7 n-Hexyl 1-[2-(4-isopropylphenyl)-2-oxoethyl]-4-phenylpiperidine-4-carboxylate is obtained following the procedure described in Example 1 using n-hexyl 4-phenylpiperidine-4-carboxylate and 2-(4-isopropylphenyl)-2-oxoethyl bromide.

EXAMPLE 8

Ethyl 1 - [1 - (4-nitrophenyl)-1-oxo-2-propyl]-4-phenylpiperidine-4-carboxylate is obtained following the procedure described in Example 1 using ethyl 4-phenylpiperidine-4-carboxylate and 1-(4-nitrophenyl)-1-oxo-2-propyl bromide.

EXAMPLE 9

Ethyl 1-[1-(4-aminophenyl)-1-oxo-2-propyl]-4-phenylpiperidine-4-carboxylate is obtained following the procedure described in Example 1 using ethyl 4-phenylpiperidine-4-carboxylate and 1-(4-aminophenyl)-1-oxo-2-propyl bromide. Alternatively, this compound is obtained by reacting the corresponding nitrophenyl compound of Example 8 with a reducing agent effective to reduce nitro groups to amino groups, e.g., iron and hydrochloric acid.

EXAMPLE 10

Isopropyl 1-[2-(3-n-butylaminophenyl)-2-oxoethyl]-4-phenylpiperidine-4-carboxylate is obtained following the procedure described in Example 1 using isopropyl 4-phenylpiperidine-4-carboxylate and 2-(3-n-butylaminophenyl)-2-oxoethyl bromide.

EXAMPLE 11

Ethyl 1-[1-(4-acetylaminophenyl)-1-oxo-2-propyl]-4-phenylpiperidine-4-carboxylate is obtained following the procedure described in Example 1 using ethyl 4-phenylpiperidine-4-carboxylate and 1-(4-acetylaminophenyl)-1-oxo-2-propyl bromide. Alternatively, this product is obtained by reacting the corresponding aminophenyl compound of Example 9 with an acetylating agent, e.g., acetic anhydride.

EXAMPLE 12

Ethyl 1-[1-(2-methylmercaptophenyl)-1-oxo-2-butyl]-4-phenylpiperidine-4-carboxylate is obtained following the procedure described in Example 1 using ethyl 4-phenylpiperidine-4-carboxylate and 1-(2-methylmercaptophenyl)-1-oxo-2-butyl bromide.

EXAMPLE 13

Ethyl 1[1-(4-n-butylsulfonylphenyl)-1-oxo-2-propyl]-4-phenylpiperidine-4-carboxylate is obtained following the procedure described in Example 1 using ethyl 4-phenylpiperidine-4-carboxylate and 1-(4-n-butylsulfonylphenyl)-1-oxo-2-propyl bromide.

EXAMPLE 14

Ethyl 1-[2-(3,4-dichlorophenyl)-2-oxoethyl]-4-phenylpiperidine-4-carboxylate is obtained following the procedure described in Example 1 using ethyl 4-phenylpiperidine-4-carboxylate and 2-(3,4-dichlorophenyl)-2-oxoethyl bromide.

EXAMPLE 15

Ethyl 1-[1-(2-chloro-4-ethoxyphenyl)-1-oxo-2-propyl]-4-phenylpiperidine-4-carboxylate is obtained following the procedure described in Example 1 using ethyl 4-phenylpiperidine-4-carboxylate and 1-(2-chloro-4-ethoxyphenyl)-1-oxo-2-propyl bromide.

EXAMPLE 16

*Lower-Alkyl 1-[2-(Monocarbocyclic-Aryl)-2-Hydroxy-(Lower-Alkyl)]-4-Phenylpiperidine-4-Carboxylates*

The preparation of these compounds is illustrated by the following preparation of ethyl 1-[1-(3,4-dihydroxyphenyl)-1-hydroxy-2-butyl]-4-phenylpiperidine-4-carboxylate.

A mixture containing 11.3 g. of ethyl 1-[1-(3,4-dibenzyloxyphenyl)-1-oxo-2-butyl]-4-phenylpiperidine-4-carboxylate, Raney nickel catalyst and enough dry n-butanol to bring the total volume to 90 cc. was hydrogenated under pressure. The reaction time was about ninety minutes and the temperature was kept between 70 and 80° C., with the initial hydrogen pressure being about 680 lbs./sq. inch and the final pressure being about 580 lbs./sq. inch. The reaction mixture was then filtered to remove the catalyst and the filtrate was concentrated in vacuo to yield the viscous oily product, ethyl 1-[1-(3,4-dihydroxyphenyl)-1-oxo-2-butyl]-4-phenylpiperidine-4-carboxylate. This was dissolved in about 400 cc. of dry ether and the resulting solution was treated with gaseous hydrogen chloride. The precipitate which separated was collected, washed with ether and dissolved in a minimum quantity of 2-propanol (about 30 cc.). To this solution was added about 300 cc. of ethyl acetate and the resulting solution was treated gradually with ether until a permanently cloudy solution resulted. The precipitate which separated was collected, triturated with dry ether and collected by filtering. There was thus obtained 5.5 g. of ethyl 1-[1-(3,4-dihydroxyphenyl)-1-hydroxy-2-butyl]-4-phenylpiperidine-4-carboxylate in the form of its hydrochloride, M.P. 103–116.5° C. (corr.) with decomposition.

*Analysis.*—Calcd. for $C_{24}H_{31}NO_5 \cdot HCl$: C, 63.04; H, 7.17; Cl, 7.88. Found: C, 63.73; H, 7.31; Cl, 7.97.

Following the above procedure using hydrobromic acid, sulfamic acid or ethanesulfonic acid in place of hydrogen chloride results in the formation of the corresponding hydrobromide, sulfamate or ethanesulfonate, respectively.

Pharmacological evaluation of ethyl 1-[1-(3,4-dihydroxyphenyl)-1-hydroxy-2-butyl]-4-phenylpiperidine-4-carboxylate hydrochloride in aqueous solution administered intraperitoneally by the Rat Thermal Stimulus Method of Bass and Vander Brook [J. Am. Pharm. Assoc., Sci. Ed., 41, 569–570 (1952)] has shown that this compound is approximately one-third as active an analgesic as meperidine hydrochloride.

Following the above procedure described in Example 16 using in place of ethyl 1-[1-(3,4-dibenzyloxyphenyl)-1-oxo-2-butyl]-4-phenylpiperidine-4-carboxylate the 1-[2-(monocarbocyclic-aryl)-2-oxo-(lower-alkyl)] compounds of Examples 3–15, the corresponding 1-[2-(monocarbocyclic-aryl)-2-hydroxy-(lower-alkyl)] compounds are obtained. For example, use of the products of Examples 2, 3, 5 and 9 results in the formation of ethyl 1-(1-hydroxy-1-phenyl-2-propyl)-4-phenylpiperidine-4-carboxylate, ethyl 1-(2-hydroxy-2-phenylethyl)-4-phenylpiperidine-4-carboxylate, n-propyl 1-[1-(4-ethoxyphenyl)-1-hydroxy-2-propyl]-4-phenylpiperidine-4-carboxylate and ethyl 1-[1-(4-aminophenyl)-1-hydroxy-2-propyl]-4-phenylpiperidine-4-carboxylate, respectively. These compounds can be isolated in their free base form or in the form of their acid-addition salts, preferably the hydrochlorides.

The above-described lower-alkyl 1-[2-(monocarbocyclic-aryl)-2-hydroxy-(lower-alkyl)]-4-phenylpiperidine-4-carboxylates can be formulated in the same manner as meperidine, e.g., in aqueous or aqueous-ethanol menstruum, or in solid form, e.g., tablet or powder. The tablet formulation can be prepared using conventional excipients, and the powder can be compounded in capsule form. These preparations can be administered orally or, in the case of aqueous preparations, intramuscularly or intravenously.

I claim:

1. A composition of matter selected from the group consisting of lower-alkyl 1-[2-(monocarbocyclic-aryl)-2-oxo-(lower-alkyl)]-4-phenylpiperidine-4-carboxylates having the formula

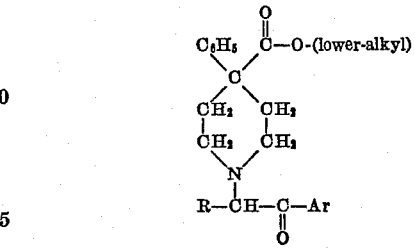

where R represents a member selected from the group consisting of hydrogen, methyl and ethyl, $C_6H_5$ represents phenyl and Ar represents a monocarbocyclic-aryl radical selected from the group consisting of unsubstituted-phenyl and phenyl having from one to three substituents selected from the group consisting of nitro, amino, (lower-alkyl)-amino, (lower-alkanoyl)amino, lower-alkyl, lower-alkoxy, benzyloxy, lower-alkylmercapto, lower-alkylsulfonyl and halo; and acid-addition salts thereof.

2. Ethyl 1-(1-oxo-1-phenyl-2-propyl)-4-phenylpiperidine-4-carboxylate.

3. Ethyl 1-[1-(3,4-dibenzyloxyphenyl)-1-oxo-2-butyl]-4-phenylpiperidine-4-carboxylate.

4. The process of preparing ethyl 1-[1-(3,4-dihydroxyphenyl)-1-hydroxy-2-butyl]-4-phenylpiperidine-4-carboxylate which comprises catalytically hydrogenating ethyl 1-[1-(3,4-dibenzyloxyphenyl)-1-oxo-2-butyl]-4-phenylpiperidine-4-carboxylate.

5. Ethyl 1-[1-(3,4-dihydroxyphenyl)-1-hydroxy-2-butyl]-4-phenylpiperidine-4-carboxylate.

6. Ethyl 1-[1-(3,4-dihydroxyphenyl)-1-hydroxy-2-butyl]-4-phenylpiperidine-4-carboxylate hydrochloride.

References Cited in the file of this patent

UNITED STATES PATENTS

| | | |
|---|---|---|
| 2,776,293 | Levy et al. | Jan. 1, 1957 |
| 2,846,437 | Elpern | Aug. 5, 1958 |
| 2,858,316 | Morren | Oct. 28, 1958 |
| 2,962,501 | Cutler et al. | Nov. 29, 1960 |

FOREIGN PATENTS

| | | |
|---|---|---|
| 546,982 | Belgium | Apr. 30, 1956 |

OTHER REFERENCES

Braenden et al.: Bull. World Health Org., vol. 13, pp. 956–962 (1955).

Gaylor: Reduction With Complex Metal Hydrides, pp. 100–1 (1956).

Perrine et al.: J. Org. Chem., vol. 21, pp. 125–126 (1956).

Janssen et al.: Acta Physiol. et Pharmacol. Neerland vol. 7, pages 373–402 (1958).